United States Patent [19]

Kunz et al.

[11] Patent Number: 4,655,682

[45] Date of Patent: Apr. 7, 1987

[54] COMPRESSOR STATOR ASSEMBLY HAVING A COMPOSITE INNER DIAMETER SHROUD

[75] Inventors: Cleon V. Kunz, West Hartford; Dennis H. Jones, Somers, both of Conn.

[73] Assignee: United Technologies Corporation, Hartford, Conn.

[21] Appl. No.: 781,606

[22] Filed: Sep. 30, 1985

[51] Int. Cl.$^4$ ............................................. F04D 29/66
[52] U.S. Cl. .................................... 415/119; 415/217
[58] Field of Search ............................. 415/216–218, 415/189–191, 185, 187, 119, 137; 416/500

[56] References Cited

U.S. PATENT DOCUMENTS

| | | | |
|---|---|---|---|
| 3,442,442 | 5/1969 | Seiwert | 415/218 X |
| 3,849,023 | 11/1974 | Klompas | 415/217 X |
| 3,957,391 | 5/1976 | Vollinger | 415/116 |
| 4,009,969 | 3/1977 | Kadera et al. | 415/217 |
| 4,386,989 | 6/1983 | Aubry | 156/182 |
| 4,417,854 | 9/1983 | Cain et al. | 416/241 |
| 4,422,827 | 12/1983 | Buxe et al. | 416/193 |
| 4,429,883 | 2/1984 | Nakanishi | 277/53 |

FOREIGN PATENT DOCUMENTS 2110768 6/1983 United Kingdom .

Primary Examiner—Robert E. Garrett
Assistant Examiner—Joseph M. Pitko
Attorney, Agent, or Firm—James M. Rashid

[57] ABSTRACT

In the compressor section of a gas turbine engine, a stator assembly comprises an outer vane support structure, an inner vane support structure, and a plurality of stator vanes which extend radially therebetween. The inner vane support structure includes a one piece inner ring, and a plurality of shroud sections which surround and are bonded to the ring. Each shroud section has arcuate cavities which receive and retain therein the inner end of a stator vane. The ring and shroud sections are fabricated from composite materials.

15 Claims, 9 Drawing Figures

COMPRESSOR STATOR ASSEMBLY HAVING A COMPOSITE INNER DIAMETER SHROUD

DESCRIPTION

1. Technical Field

The present invention relates to gas turbine engines, and in particular, to compressor stator assemblies for gas turbine engines.

2. Background Art

A gas turbine engine includes a compressor section, a combustion section, and a turbine section, all circumscribed by an annular engine case. In the compressor and turbine sections, working medium gases move axially along an annular gas flow path, through a series of rotor assemblies and stator assemblies.

Each stator assembly includes a plurality of vanes which extend radially across the flow path. The outer ends of the vanes are attached either directly to the engine case, or to an outer stator shroud which is supported from the engine case. Depending on the specific engine design, the case or outer stator shroud defines the outer boundary of the flow path. The inner ends of the vanes support an inner stator shroud or wall which defines the inner boundary of the flow path.

Stator assembly components are typically metal structures; and in the forward section of the compressor, are subjected to relatively low operating temperatures. An attempt to reduce the weight of a compressor stator assembly, and the engine, so as to increase engine operating efficiency, is shown in U.S. Pat. No. 3,849,023. Therein, circumferentially segmented, arcuate inner stator shroud sections are fabricated from a light weight plastic rather than metal, and are bolted together to form an annular inner stator shroud. The radially inner and outer ends of the stator vanes are specially shaped, and engage dove-tail type slots in the inner shroud sections and engine case, respectively. Precise dimensional control of the vanes and shroud sections is required in this prior art design, in order to permit insertion of each vane into its respective inner and outer slot without the need to bend or distort the shroud sections during assembly. If there is any distortion, undesired stresses may be produced in the stator assembly which may result in its premature failure. Additionally, distortion of the stator assembly may change the shape of the gas flow path, which could decrease engine operating efficiency.

Another example of a weight reducing stator assembly is shown in FIGS. 1–2. In this design, used in some gas turbine engines manufactured by Pratt & Whitney, a division of United Technologies Corporation, a radially inner stator shroud assembly 10 comprises a plurality of arcuate stator segments 12 fabricated from a composite material, which are adhesively bonded to arcuate, circumferentially segmented bands 14. Each band 14 overlies the interface 16 between adjacent, circumferentially disposed segments 12. The inner shroud assembly 10 also includes a labyrinth rub strip 18 attached to the radially inwardly facing side of each band 14. The rub strip 18 overlies the interface 19 between adjacent bands 14. Each stator segment 12 includes a plurality of arcuate, circumferentially spaced apart cavities 20 for receiving the inner end 22 of each stator vane 24. The inner end 22 of each stator vane 24 is surrounded by a silicone rubber vibration damping material 26 which is bonded to the walls of the cavity; the silicone rubber 26 secures each vane end 22 within its cavity 20. The outer end of each vane 24 is rigidly attached to the stator outer shroud (not shown). In this prior art design, the circumferential width of each cavity 20 is constant from the cavity forward end 28 to the cavity rearward end 30, and the depth of each cavity 20 increases from its forward end 28 to its rearward end 30.

In this specification and in the appended claims, the term "composite" is intended to mean a material characterized by a distribution of fibers such as glass, graphite, or silicone carbide, within a matrix of cured epoxy or any of the known polyesters or polyimides.

While the aforementioned designs demonstrate that composite materials can be utilized in gas turbine engines, engineers are constantly investigating and evaluating new and improved designs which incorporate such materials. Other U.S. Patents which indicate the general state of the art as related to composite compressor stator assemblies are U.S. Pat. Nos. 3,849,023, 4,063,847, 4,098,559, 4,191,510, and 4,398,866; U.S. Patents which indicate the state of the art as related to stator assemblies in general are U.S. Pat. Nos. 2,252,817, 3,778,184, 3,887,976, 3,932,056, and 4,305,696.

Disclosure of the Invention

One object of the present invention is to reduce the weight of a gas turbine engine.

Another object of the present invention is an easily assembled compressor stator structure.

Yet another object of the present invention is a low cost, light weight compressor stator assembly having an inner vane support structure fabricated from composite materials.

According to the present invention, a compressor stator assembly for a gas turbine engine comprises an outer vane support structure, an inner vane support structure concentric with the outer structure, and a circumferential row of stator vanes, each vane attached at its outer end to the outer vane support structure and extending radially inwardly therefrom, wherein the inner vane support struture includes a one piece composite material support ring, and a plurality of arcuate, circumferentially segmented, composite material shroud sections surrounding and attached to radially facing and axially facing surfaces of the support ring, and wherein each shroud section includes a plurality of circumferentially spaced apart cavities for receiving each vane inner end, and each cavity contains a vibration damping compound for engaging and retaining therein one vane inner end.

One aspect of the present invention is that the support ring has a circumferential, radially inwardly extending V-shaped channel, the channel defined by circumferential legs which extend radially inwardly and converge at the channel vertex. Each shroud section has radially inwardly extending projections which are bonded to the channel legs.

One advantage of the present invention is that assembly of the stator structure is easier than assembly of stator structures of the prior art.

Another advantage of the present invention is that due to the one piece inner ring, the inner support structure has markedly improved hoop strength as compared to stator assemblies of the prior art, in which the inner shroud is circumferentially segmented.

The foregoing and other objects, features and advantages of the present invention will become more apparent in the light of the following detailed description of

BEST MODE FOR CARRYING OUT THE INVENTION

Figure 1:
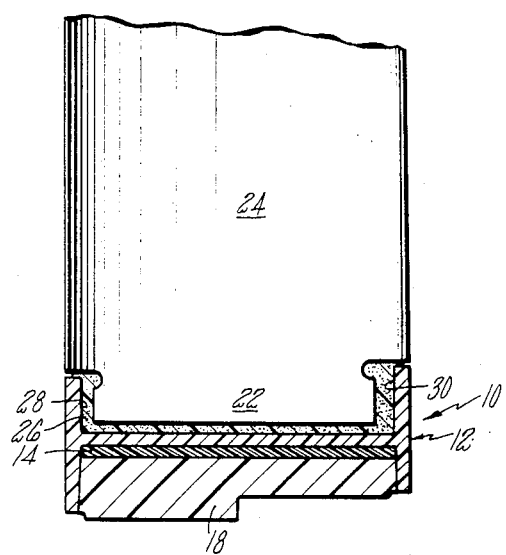
FIG. 1 is a cross sectional view of an inner shroud portion of a compressor stator assembly of the prior art.
Figure 2:
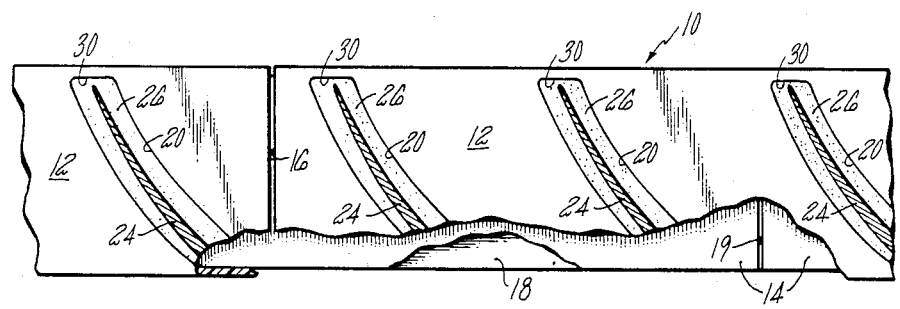
FIG. 2 is a top view partly broken away of the inner shroud portion shown in FIG. 1.
Figure 3:
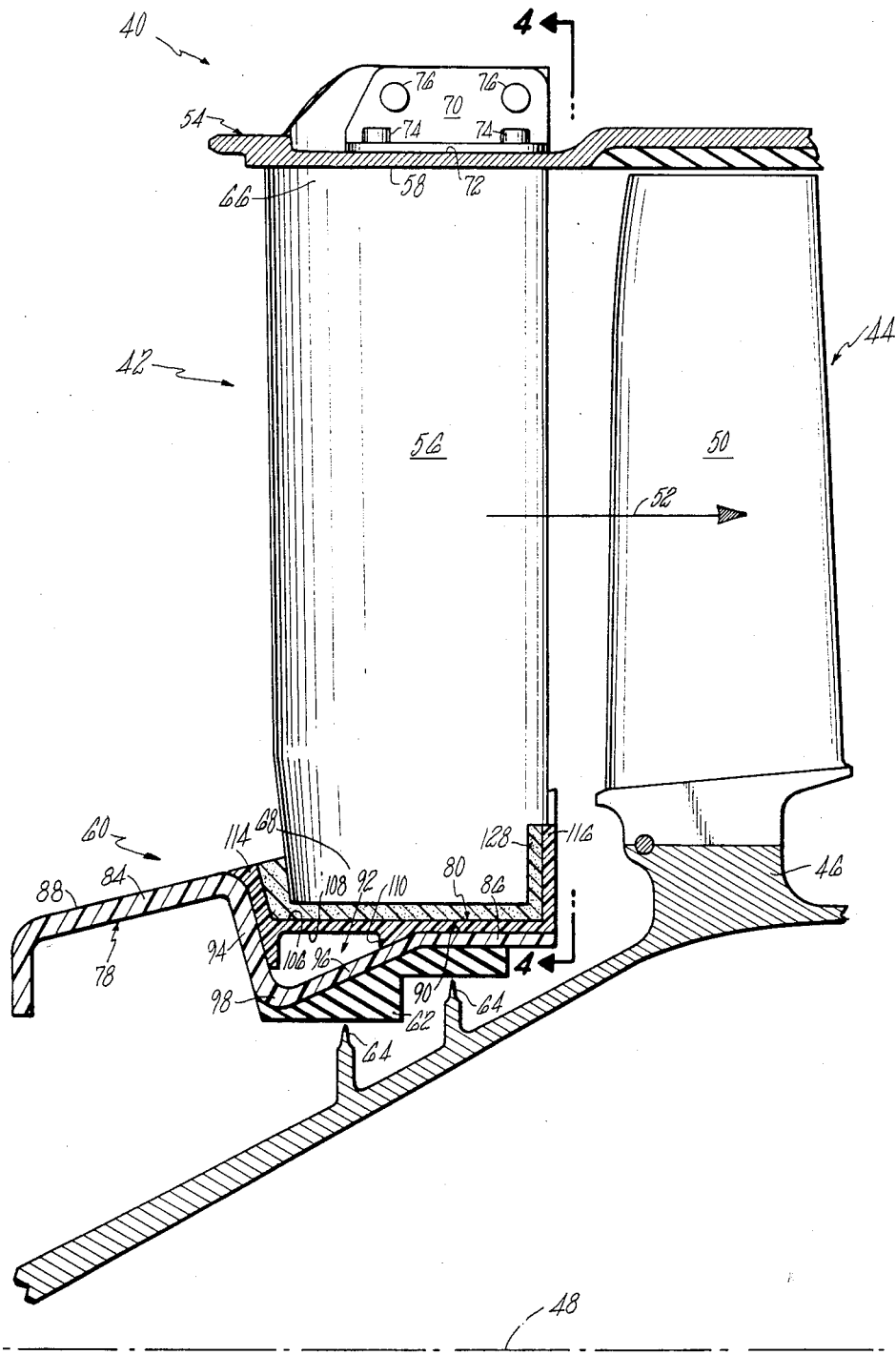
FIG. 3 is a simplified cross sectional view of a portion of the compressor section of an axial flow gas turbine engine which incorporates features of the present invention.
Figure 4:
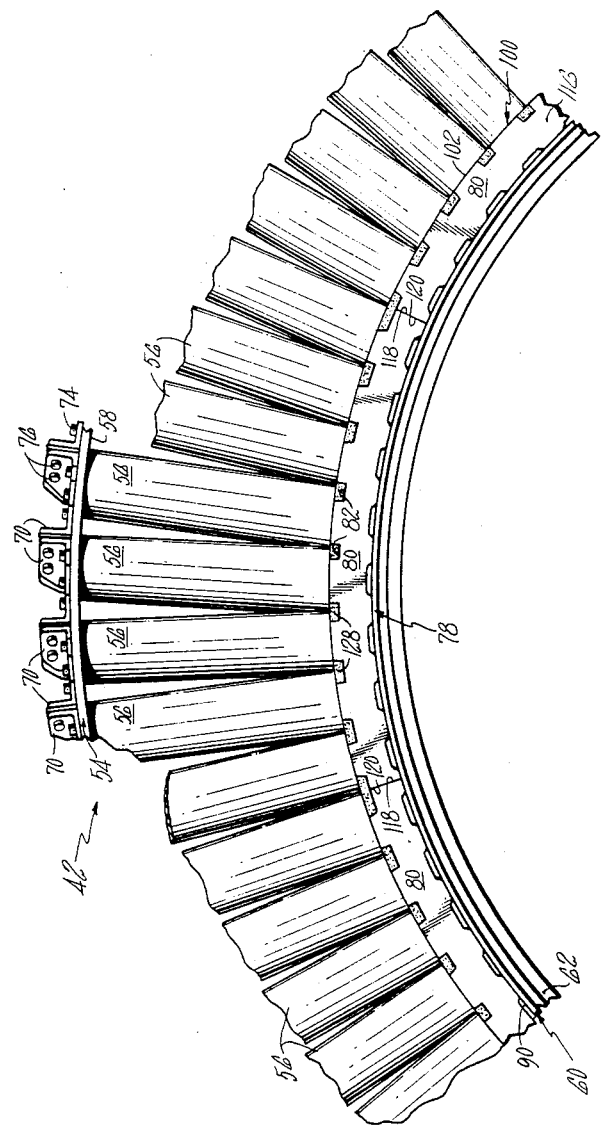
FIG. 4 is a cross sectional view taken along the lines 4—4 of FIG. 3.

As an exemplary embodiment of the present invention, consider the portion of a compressor section of an axial flow gas turbine engine shown in FIG. 3 and generally represented by the reference numeral 40. The compressor section 40 includes a stator assembly 42 and an axially adjacent rotor assembly 44. The rotor assembly 44 includes a disk 46 which rotates about the engine axis 48, and a circumferential row of blades 50 attached to the disk 46 in any conventional manner. The blades 50 extend radially outwardly from the disk 46, and across a flow path 52 of working medium gases. Referring also to FIG. 4, the stator assembly 42 includes an outer vane support structure 54 and a circumferential row of vanes 56 which are attached to the structure 54 and which extend radially inwardly therefrom. The radially inwardly facing surface 58 of the outer structure 54 defines the outer boundary of the flow path 52. The stator assembly 42 also includes an inner vane support structure 60. As the gases move through the stator assembly 42, the radially outwardly facing surface of the inner structure 60 defines the inner boundary of the flow path 52. The inner structure 60 includes a labyrinth type seal 62 which is engageable by knife edges 64 integral with the disk 46.

Each stator vane 56 has radially opposed outer and inner ends, 66, 68, respectively. The outer end 66 of each vane 56 extends through a slot (not shown) in the outer structure 54. Adjacent to each slot are a pair of closely spaced brackets 70 which are attached to the structure outer surface 72 by rivets 74. The outer end 66 of one vane 56 is disposed between each pair of brackets 70, and is attached to the brackets 70 by rivets 76. In this manner, the outer end 66 of each vane 56 is rigidly attached to the outer structure 54. The vanes 56 extends radially across the gas flow path 52, and as described hereinbelow, the vane inner ends 68 support the inner vane support structure 60.

The components of the inner vane support structure 60 are fabricated from composite materials having a high strength-to-weight ratio, which results in significant weight savings as compared to stator assemblies which utilize metallic materials. The inner support structure 60 comprises a one piece inner ring 78, and a plurality of arcuate, circumferentially segmented shroud sections 80 which surround and are attached to the inner ring 78. Each shroud section 80 has a plurality of circumferentially spaced apart cavities 82, and each cavity 82 receives and retains therein one vane inner end 68. As will be described hereinbelow, there are slight geometric differences between the cavities 82 in each shroud section 80.

Referring to FIG. 3, the inner ring 78 has an axially extending forward land and rearward land 84, 86, respectively. The forward land 84 is inclined relative to the engine axis of rotation 48, while the rearward land 54 is substantially cylindrical. The forward land 84 has a radially outwardly facing surface 88, and the rearward land 86 has a radially outwardly facing surface 90. Between the lands 84, 86, the ring 78 has a radially inwardly extending, annular V-shaped channel 92. The channel 92 has a forward leg 94 and a rearward leg 96, both legs 94, 96 extending radially inwardly in opposite axial directions towards a channel vertex 98. Because the inner ring 78 is one piece, when the shroud sections 80 are bonded to the ring 78 as described below, the inner vane support structure 60 has markedly improved hoop strength as compared to the segmented shroud assemblies of the prior art. Also, the cross sectional shape of the gas path inner boundary is precisely circular, which is aerodynamically efficient.

In the preferred embodiment of the present invention, the inner ring 78 is a laminated structure, comprising a plurality of polyamide fabric plies impregnated with the thermosetting epoxy resin. Examples of the specific materials which may be used to fabricate the inner ring 78 are AMS 3902 style 285 Kevlar ® fabric, available from Burlington Glass Fabrics, Altavista, Va., and Epon 826 resin, available from Shell Development Corp., Houston, Tex. The inner ring 78 is fabricated by the dry layup/resin transfer process, common in the art.

Figure 5:
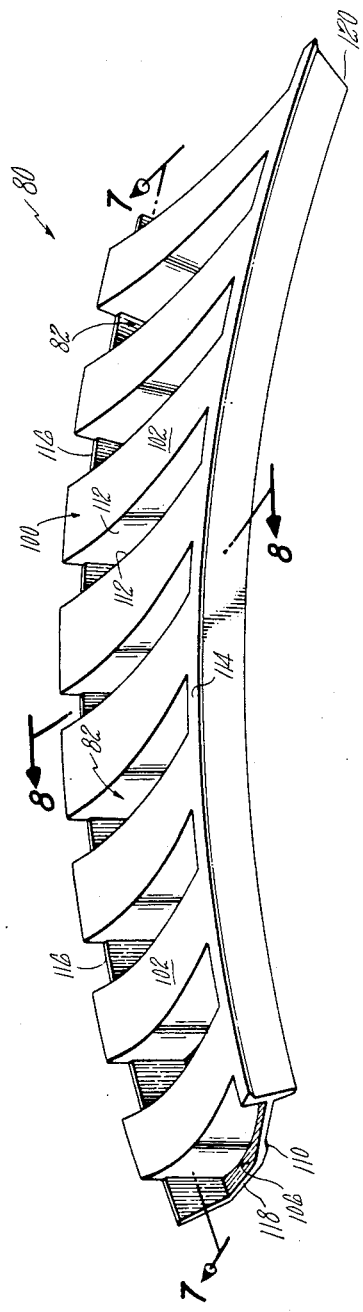
FIG. 5 is a perspective view of an inner shroud section of the present invention, prior to its assembly into a stator structure, showing the radially outer surfaces and front face of the section.
Figure 6:
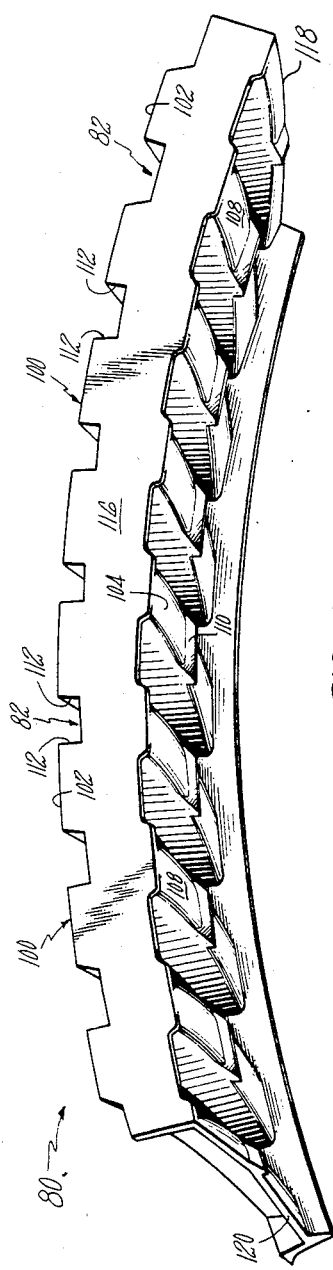
FIG. 6 is a perspective view of the inner shroud section of FIG. 5, showing the radially inner surfaces and rear face of the section.
Figure 7:
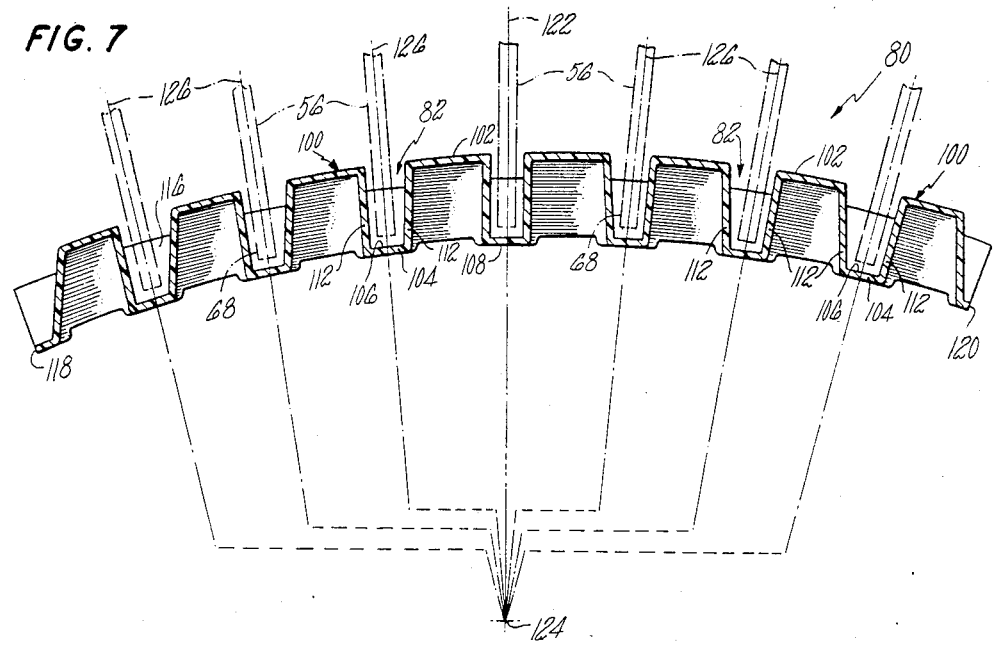
FIG. 7 is a cross sectional view taken generally along the lines 7—7 of FIG. 5, with the stator vanes shown in phantom.
Figure 8:
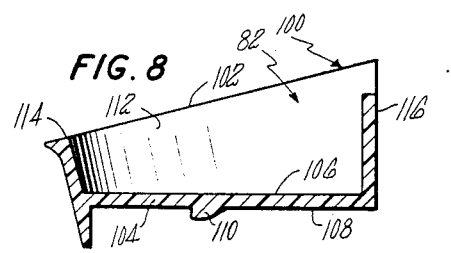
FIG. 8 is a cross sectional view taken generally along the lines 8—8 of FIG. 5.

Referring to FIGS. 5-7, each shroud section 80 has a corrugated structure, i.e., an alternating series of ridges 100 and cavities 82. Because of the corrugated structure, the radially outwardly facing surface 102 of each ridge 100 defines the gas path surface of each shroud section 80. Referring also to FIG. 8, wall sections 104 define the base 106 of each cavity 82. The radially inwardly facing surface 108 of each wall section 104 includes a radially inwardly and circumferentially extending tang 110. The cavity depth (measured from the gas path surface 102 to the base 106) increases in the rearward axial direction. Arcuate, axially extending sidewalls 112 define the circumferential boundaries of the cavities 82, and forward and rearward endwalls 114, 116, respectively, define the axial boundaries of the cavities 82. The radial height of the sidewalls 112 is greater than the height of the rearward endwall 116 where the walls 112, 116 meet. The degree of curvature of the cavity sidewalls 112 is similar to the degree of curvature of the airfoil shaped vane inner ends 68, although the axial width of each cavity 82 is greater than the thickness of each vane end 68, and the cavity width decreases in the rearward axial direction. As will be described in greater detail below, the cavities 82 are specially shaped so as to easily receive and retain therein each vane inner end 68, and to simplify the fabrication of the shroud sections 80.

Each shroud section 80 is fabricated from a chopped fiberglass reinforced nylon composite, preferably 33% fibers by weight, using injection molding techniques. Such material is available as RF-1006 (LNP Corp., Malvern, Pa.) or Zytel 70G33BK (E. I. Dupont Co., Inc., Wilmington, Del.). To facilitate removal of each shroud section 80 from the injection molding apparatus after the shroud section 80 has been fabricated, the design of the cavities 82 is as described hereinbelow. Each shroud section 80 has a centerline 122 (FIG. 7) passing through the central cavity 82 of the shroud section 80, which preferably has an odd number of cavities 82. The centerline 122 also passes through the center of curvature 124 of the shroud section 80. Each cavity 82 preferably has its sidewall 112 nearest the centerline 122 parallel to the centerline 122. The other sidewall 112 of each cavity 82 diverges radially outwardly away from its opposing cavity sidewall 112, and preferably is parallel to a radial line passing through the shroud section center of curvature 124. Because of the construction of each shroud section 80, and in particular the shape of the cavities 82, at the completion of the injection molding process the molding dies can be moved apart along a line parallel to the section centerline 122 in order to remove the shroud section 80 molded therebetween.

Each shroud section 80 is bonded to the inner ring 78 using an epoxy film adhesive such as FM 250K (American Cyanamid Corp., Havre de Grace, Md.) or AF 3109-2K (Minnesota Mining and Manufacturing Co., St. Paul, Minn.). As seen in FIG. 3, the axially facing forward endwall 114 of the shroud section 80 is bonded to the ring forward leg 94; the axially rearward facing portion of the tang 110 is bonded to the rearward leg 96; and the portion of the shroud section to the rear of the tang 110 is bonded to the ring rearward land 86. Since the forward leg 94 faces in the generally rearward axial direction, the rearward leg 96 faces in the generally forward axial direction, and the rearward land 86 faces radially inwardly, each shroud section 80 is bonded to the inner ring 78 on three distinct planes, which maintains the shroud section 80 in a fixed position more securely than constructions of the prior art. Preferably, the circumferential ends 118, 120 of each shroud section 80 define portions of cavity 82 which mate with corresponding portions of adjacent shroud sections 80 to form complete cavities 82 upon assembly, FIG. 4.

As noted above, each stator vane 56 extends radially inwardly from the outer support structure 54. The length of each vane 56 is chosen so that in the assembled stator structure 40, the vane inner end 68 is slightly spaced from the base 106 of its respective cavity 82, FIGS. 3 and 7. Also, since the cavities 82 are longer and wider than the vane inner ends 68, each vane end 68 is slightly spaced from its respective axially facing cavity endwalls 114, 116 and circumferentially facing cavity sidewalls 112. Such a construction simplifies assembly of the stator structure 42. The inner end 68 of each vane 56 is inserted radially inwardly through a slot (not shown) in the outer vane support structure 54, and positioned within its respective shroud section cavity 82. Fixturing devices are utilized to locate and hold each vane 56 at its correct position, and each vane outer end 66 is riveted to the outer structure 54 as described above. Preferably, the datum line 126 of each stator vane 56 lies on a radial line which passes through the shroud section center of curvature 124. A vibration damping silicone rubber material 128 is added to each cavity 82 to retain each vane inner end 68 therein. The silicone rubber 128 bonds to the cavity walls, and completely fills each cavity 82, surrounding and bonding to each vane end 68. The rubber 128 is substantially flush with the shroud outer, gas path surface 102, and with the shroud rear endwall 116. Representative of silicone rubber materials which may be used are Silastic J (Dow Corning Corp., Elizabethtown, Ky.); Dapocast 37 (D Aircraft Products, Anaheim, Calif.); and Eccosil 1478-2 (Emerson & Cummings, Inc., Canton, Mass.).

Figure 9:
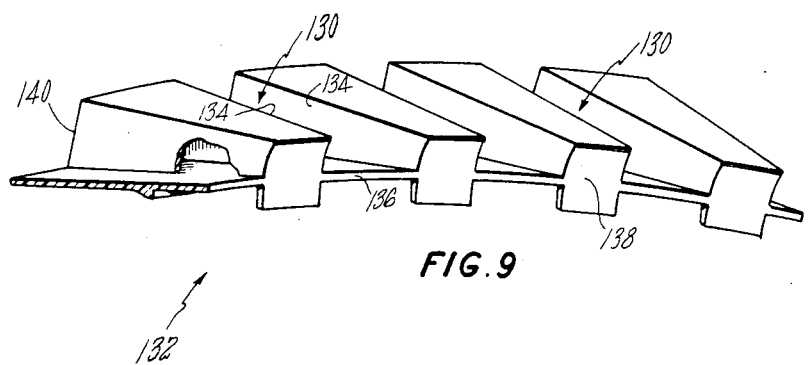
FIG. 9 is a simplified perspective view, partly in section, showing an alternate embodiment of the inner shroud section of the present invention.

It should be noted that the shape of the cavities may be altered to meet the specific requirements of the stator assembly 42. In an alternate embodiment of the present invention, shown in FIG. 9, the cavities 130 extend from one axial end of the shroud section 132 to the other end of the shroud section 132, and have no axially facing boundaries. The cavities 130 are defined only by circumferentially facing sidewalls 134 and the radially facing wall 136. In this construction, the shroud sections 132 are considerably less rigid, and can be more easily bent in a radial direction than the sections 48 shown in FIGS. 5-6. Such a design could be used if flexibility were required to aid in assembly of the stator structure. The cavities 130 need not be arcuate; they may also be straight, as shown in FIG. 9, and extend in the axial direction either perpendicular to, or at an angle to the shroud ends 138, 140. In this alternate embodiment, the cavities are tapered, i.e., the cavity width decreases in the rearward axial direction. It is believed that this feature would limit the movement of the inner support structure in the forward axial direction during an aerodynamic pressure disturbance, or surge. Since the vanes are rigidly attached to the outer support structure, axial movement of the vanes will be limited during a pressure disturbance. Also, since the cavities are tapered, movement of the shroud sections 132, and the ring they are bonded to, will be limited. This is because the narrow, rearward portion of each cavity 130 cannot move axially forward, past the wider mass of silicone rubber which is believed will remain stationary, bonded to the vane inner end.

Although the invention has been shown and described with respect with a prefered embodiment thereof, it should be understood by those skilled in the art that other various changes and omissions in the form and detail thereof may be made therein without departing from the spirit and scope of the invention.

We claim:

1. A stator assembly for a gas turbine engine, comprising:
    (a) an outer vane support structure;
    (b) a circumferential row of vanes, each vane having a radially outer end and inner end, wherein each vane outer end is attached to said outer vane support structure and extends radially inwardly therefrom; and
    (c) an inner vane support structure concentric with said outer vane support structure, said inner support structure comprising a one piece inner ring of composite material, having a radially outwardly facing surface, and a radially inwardly and circumferentially extending V-shaped channel, said channel having a forward leg and a rearward leg which converge radially inwardly to meet and form the vertex of said channel, said inner vane support structure also comprising a plurality of arcuate, circumferentially disposed shroud sections of composite material surrounding and attached to said outwardly facing ring surface and to at least one of said channel legs, and wherein each shroud section has a plurality of circumferentially spaced apart, radially inwardly and axially extending cavities, one of said vane inner ends extending into each of said cavities, and each cavity including damping means for engaging and retaining the vane inner end disposed therein.

2. The stator assembly of claim 1, wherein each of said shroud sections is adhesively bonded to at least one of said channel legs.

3. The stator assembly of claim 2, wherein each of said shroud sections includes at least one radially inwardly extending member bonded to one of said channel legs.

4. The stator assembly of claim 3, wherein each of said cavities has a wall section defining a base, and said wall section has a radially inwardly facing surface, and wherein each of said shroud sections has a tang which extends radially inwardly from said surface and is adhesively bonded to said rearward leg.

5. The stator assembly of claim 1, wherein the circumferential width of each cavity decreases in the rearward axial direction.

6. The stator assembly of claim 1, wherein each cavity has forward and rearward endwalls joined by circumferentially facing sidewalls, wherein the radial height of said rearward endwall is less then the radial height of said sidewalls where said walls meet.

7. The stator assembly of claim 6, wherein the radial depth of each cavity increases in the rearward axial direction.

8. The stator assembly of claim 1, wherein each shroud section has circumferentially facing opposite ends, each end defining a portion of one of said cavities which is adapted to mate with a corresponding cavity portion of an adjacent shroud section to form a complete cavity.

9. A stator assembly for a gas turbine engine, comprising:
(a) an outer vane support structure;
(b) a circumferential row of vanes, each vane having a radially outer end and inner end, wherein each vane outer end is attached to said outer vane support structure and extends radially inwardly therefrom; and
(c) an inner vane support structure concentric with said outer vane support structure, said inner support structure comprising a one piece inner ring of composite material, having a radially outwardly facing surface and a circumferentially extending, axially facing surface, said inner vane support structure also comprising a plurality of arcuate, circumferentially disposed shroud sections of composite material surrounding and attached to said outwardly facing ring surface and to said axially facing ring surface, wherein each shroud section has axially facing, circumferentially extending forward and rearward end walls and a plurality of circumferentially spaced apart, radially inwardly extending cavities which extend in the axial direction through said rearward end wall, wherein one of said vane inner ends extends into each of said cavities, and each cavity includes damping means for engaging and retaining the vane inner end disposed therein.

10. The stator assembly of claim 9, wherein said cavities are defined by axially extending sidewalls, and said sidewalls are straight.

11. The stator assembly of claim 9, wherein the circumferential width of each cavity decreases in the rearward axial direction.

12. An arcuate shroud section made of composite material for a gas turbine engine stator assembly, said stator assembly comprising an outer vane support structure; a circumferential row or vanes, each vane having a radially outer end and inner end, wherein each vane outer end is attached to said outer vane support structure and extends radially inwardly therefrom; and an inner vane support structure concentric with said outer vane support structure, said inner support structure comprising a one piece inner ring of composite material having a radially outwardly facing surface, and a radially inwardly and circumferentially extending V-shaped channel, said channel having a forward leg and a rearward leg which converge radially inwardly to meet and form the vertex of said channel, wherein said shroud section is comprised of:
(a) a circumferentially extending, radially inwardly facing surface for attachment to said radially outwardly facing surface of said inner ring;
(b) a circumferentially extending, axially facing surface for attachment to said forward leg of said inner ring;
(c) axially facing and circumferentially extending forward and rearward end walls; and
(d) a plurality of circumferentially spaced apart, radially inwardly and axially extending cavities, each of said cavities for receiving the inner end of one of said vanes and dampingly retaining said vane inner end therein, and wherein each of said cavities has a wall section defining a base, and said wall section has a tang extending circumferentially and radially inwardly from said base, said tang for attachment to said rearward leg of said inner ring.

13. The shroud section of claim 12, wherein the circumferential width of each cavity decreases in the rearward axial direction.

14. The shroud section of claim 13, wherein said cavity forward and rearward end walls are joined by circumferentially extending sidewalls, and the radial height of said rearward end wall is less than the radial height of said sidewalls where said walls meet.

15. The shroud section of claim 14, wherein the radial depth of each cavity increases in the rearward axial direction.

* * * * *